(12) United States Patent
Linden

(10) Patent No.: US 6,341,594 B1
(45) Date of Patent: Jan. 29, 2002

(54) METHOD FOR SETTING A SPECIFIABLE TARGET SPEED IN A VEHICLE

(75) Inventor: Thomas Linden, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/578,479

(22) Filed: May 26, 2000

(30) Foreign Application Priority Data

May 31, 1999 (DE) .......................... 199 24 862

(51) Int. Cl.$^7$ .............................. B60K 31/00
(52) U.S. Cl. .................. 123/352; 123/399; 123/198 F; 123/350; 701/110
(58) Field of Search ................. 123/352, 350, 123/481, 361, 399, 198 F; 701/101, 102, 110; 180/197

(56) References Cited

U.S. PATENT DOCUMENTS

| | | | |
|---|---|---|---|
| 4,543,933 A | * 10/1985 | Kessler et al. | 123/399 |
| 5,137,104 A | 8/1992 | Etoh | 180/179 |
| 5,267,541 A | 12/1993 | Taguchi et al. | 123/198 F |
| 5,415,143 A | * 5/1995 | Togai | 123/481 |
| 5,625,558 A | * 4/1997 | Togai et al. | 123/350 |
| 5,646,851 A | 7/1997 | O'Connell et al. | 364/426.041 |
| 6,244,258 B1 | * 6/2001 | Akiyama et al. | 123/198 F |

FOREIGN PATENT DOCUMENTS

| | | | | |
|---|---|---|---|---|
| DE | 33 34 720 C2 | 11/1994 | | |
| DE | 44 39 424 C1 | 1/1996 | | |
| DE | 196 11 363 C1 | 6/1997 | | |
| JP | 59-88623 | * 5/1984 | ............. | G01F/1/68 |
| JP | 06-81679 | * 3/1994 | ............. | F02D/1/26 |
| JP | 11-336575 | * 12/1999 | ............. | F02D/9/02 |

* cited by examiner

Primary Examiner—John Kwon
Assistant Examiner—Hien T. Vo
(74) Attorney, Agent, or Firm—Crowell & Moring LLP

(57) ABSTRACT

In a method for setting a specifiable target speed in a motor vehicle with an internal combustion engine, actuating signals for the manipulation of the throttle valve of the internal combustion engine are produced in a speed-regulating system taking into account vehicle-state and operating variables. To improve controller behaviour in partial shut-down operation, the controller output of the regulating system is passed via a metering characteristic to produce the actuating signal which manipulates the position of the throttle valve, both full operation and partial shut-down operation being assigned a respective metering characteristic. At the time of the switchover between full operation and partial shut-down operation, the controller output is first of all passed via the metering characteristic assigned to operation hitherto and then via an inverse metering characteristic assigned to subsequent operation.

9 Claims, 1 Drawing Sheet

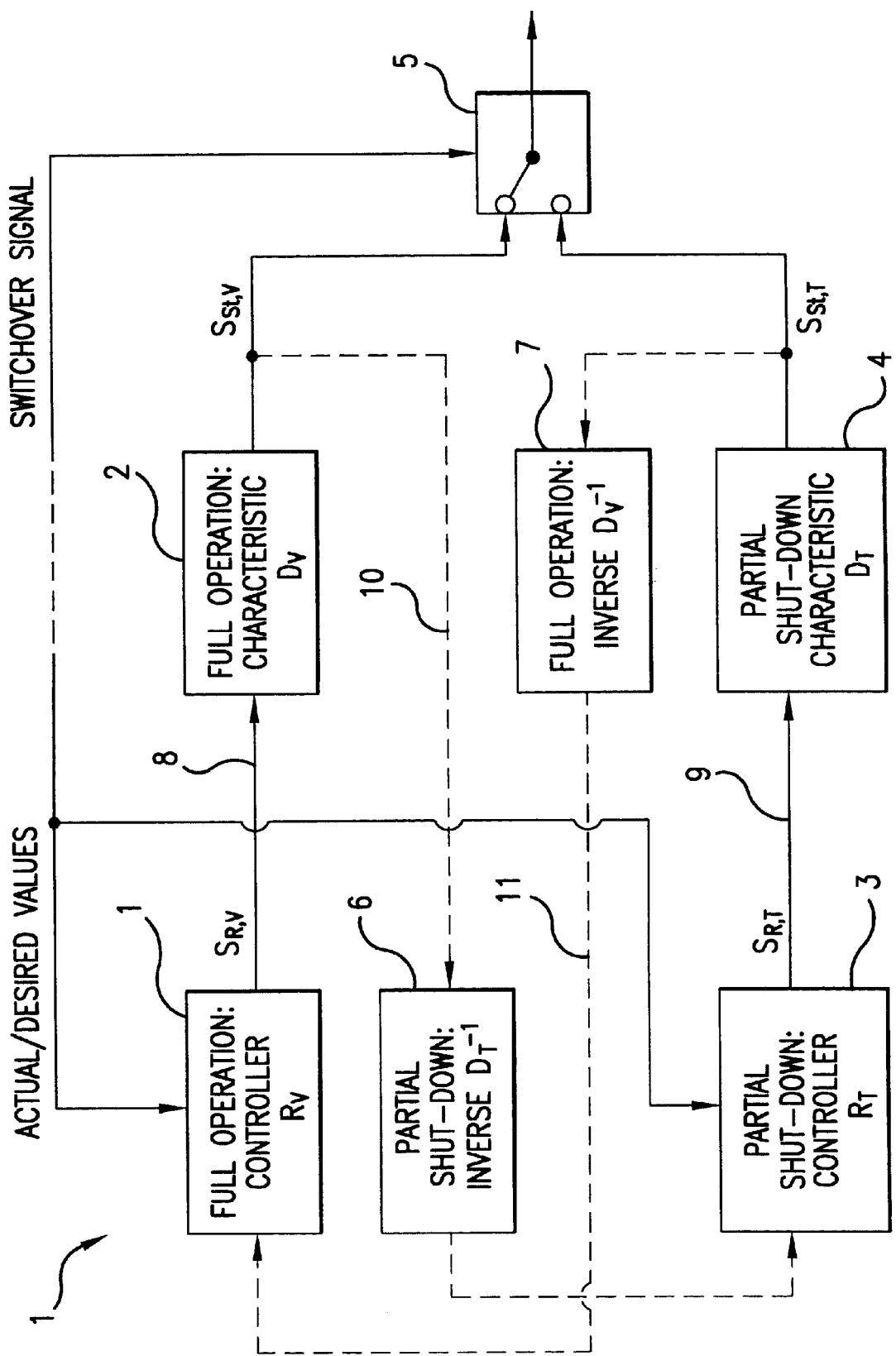

METHOD FOR SETTING A SPECIFIABLE TARGET SPEED IN A VEHICLE

BACKGROUND AND SUMMARY OF THE INVENTION

This application claims the priority of German patent document 199 24 862.1, filed May 31, 1999, the disclosure of which is expressly incorporated by reference herein.

The invention relates to a method for setting a specifiable target speed for a vehicle.

Speed-regulating systems are known, in which a target speed specified by the driver or calculated by means of an automatic determination system can be maintained automatically in a motor vehicle. These speed-regulating systems include, for example, cruise-control functions, in which the intention is that the vehicle should maintain a minimum speed selected by the driver, and limiter functions, where the vehicle must not exceed a maximum speed specified by the driver or determined automatically in spacing control systems. To implement the limiter function, actuating signals are produced in the speed-regulating system on the basis of the maximum speed and the current vehicle state variables, in particular the current vehicle speed, and these signals are used to adjust the engine, the gearbox and/or the wheel brakes to maintain the target speed.

In the speed-regulating system, the deviation of the actual speed from the specified desired value is fed to a controller—generally a $PDT_1$, controller—in which an actuating signal is produced to adjust a throttle valve in the intake duct of the internal combustion engine. To achieve linear conversion of the controller output into an associated engine torque, the controller output is first passed via a metering characteristic, which compensates for nonlinearities in the engine torque curve, and then fed as an actuating signal to an actuator of the throttle valve.

The metering characteristic and the parameters of the controller used are configured for optimum controller behaviour.

German patent document DE 44 39 424 C1 discloses a driving-speed controller which produces actuating signals that are manipulated further at the controller output in order to improve controller behaviour, particularly in low engine-load ranges. At the output of the controller there is an attenuation element which attenuates the controller signal in the lower value range before it is passed to a fuel-quantity setting element, thereby suppressing unwanted engine-speed oscillations at low engine load and improving driving comfort. Further possibilities for use and control are not disclosed by this publication, however.

On the other hand, it is also known to shut down one of two cylinder banks of a multi-cylinder internal-combustion piston engine in a partial load operation, while performing combustion in both cylinder banks in full-load operation. An internal combustion engine of this kind is disclosed, for example, in German patent document DE 196 11 363 C1. Here, there is the problem that the internal combustion engine has different transmission behavior in partial load operation and in full-load operation, and this can lead to controller instabilities when switching over between partial and full cylinder ignition in regulated speed operation. The controller parameters and the metering characteristic therefore must be adapted to match each type of operation.

German patent document DE 33 34 720 C2 describes a control apparatus in which cylinder shut-down is carried out only at steady-state operating points of the engine. Although this technique reduces the risk of instabilities, it also limits the range of application to these operating points. Thus, the advantage of cylinder shut-down (reduced fuel consumption) can also be exploited only to a limited extent.

One object of the present invention is to achieve improved controller behaviour in speed-regulating systems for vehicles with internal combustion engines which are equipped with partial cylinder shut-down.

This and other objects and advantages are achieved by the method according to the invention, in which both full operation of the internal combustion engine and partial cylinder shut-down operation are provided with respective metering characteristics, which provide an association between the controller output and the throttle-valve position in both types of operation of the engine.

In such a system, a jump in the actuating signal acting on the throttle valve in the case of a switchover when changing between full operation and partial shut-down, would lead to an abrupt change in the position of the throttle valve and to an undesirable torque jump. According to the invention, to prevent such an occurrence, during the switchover the controller output is first passed via the metering characteristic assigned to operation theretofore, and then via an inverted form of a metering characteristic assigned to the other type of operation. Jumps in the actuating signal curve during the switchover between full operation and partial shut-down are thereby avoided. The controller is initialized for the following type of operation and the actuating signal produced in the controller for the subsequent type of operation is set to the last-generated value of the actuating signal corresponding to the preceding controller, thereby ensuring a jump-free transition between the types of operation.

According to the invention, if the internal combustion engine is initially operated in full operation (ignition in all cylinders) and is switched to a partial shut-down mode (ignition is performed in only some of the cylinders) owing to a reduction in load, then, at the time of the switchover, the actuating signal produced in accordance with the full-operation metering characteristic is passed via the inverted partial shut-down operation metering characteristic, subjected to a further manipulation and finally passed to the actuator of the throttle valve.

If, on the other hand, the switchover is from partial shut-down to full operation, the actuating signal for partial shut-down operation is passed via the inverted full-operation metering characteristic and subjected to a subsequent manipulation before being passed on to the throttle-valve actuator. In both cases, the actuating signals correspond immediately before and after the switchover.

It is expedient if the manipulation of the actuator by means of the inverse metering characteristic is carried out just once at the time of the switchover. On completion of the switchover, the actuator is controlled by means of the controller assigned to the new type of operation, because it is no longer necessary to take into account the inverse metering characteristic.

Other objects, advantages and novel features of the present invention will become apparent from the following detailed description of the invention when considered in conjunction with the accompanying drawings.

BRIEF DESCRIPTION OF THE DRAWINGS

The FIGURE of the drawing shows a block diagram of a vehicle control system which can be used for speed regulation in vehicles with partial cylinder shut-down.

DETAILED DESCRIPTION OF THE DRAWINGS

The vehicle control system 1 has two branches 8, 9 for speed regulation, one for regulation during full operation of the internal combustion engine with ignition in all cylinders, and one for regulation in partial shut-down operation with ignition in only some of the cylinders. The branch 8 for regulation in full operation comprises a full-operation controller $R_V$, illustrated in block 1, and a downstream full-operation metering characteristic $D_V$, illustrated in block 2; and the branch 9 assigned to partial shut-down operation correspondingly comprises a partial shut-down operation controller $R_T$ (block 3) and a downstream partial shut-down operation metering characteristic $D_T$ (block 4). The controller parameters of the two controllers $R_V$, $R_T$ and the metering characteristics $D_V$, $D_T$ differ for full operation and partial shut-down operation.

Both controllers $R_V$ and $R_T$ receive desired and actual speed values as input signals, and the type of controller used in each case is, for example, a $PDT_1$ controller. Controller output signals $S_{R,V}$ and $S_{R,T}$ are produced in the controllers $R_V$, $R_T$ as a function of the manipulated variables, the type of control employed, the controller parameters and controller initialization, and these signals are each passed via the downstream metering characteristic $D_V$ or $D_T$, whereupon throttle-valve actuating signals $S_{St,V}$ and $S_{St,T}$ are produced. The latter are fed initially to a switch 5, and subsequently to a throttle-valve actuator to set the throttle-valve position. Depending on the type of operation of the internal combustion engine, allocation to the full-operation branch 8 or the partial shut-down operation branch 9 is performed in the switch 5, the corresponding allocation being carried out by means of a switch-over signal.

In the regular operating mode, speed regulation is achieved exclusively by means of one of the branches 8 or 9, depending on the type of operation. As soon as the type of operation is switched over from full operation to partial shut-down operation, or from partial shut-down operation to full operation, owing to changing load conditions, modified regulation is performed at the time of the switchover to avoid torque jumps, taking into account inverse metering characteristics $D_V^{-1}$ or $D_T^{-1}$, which are determined from the relationship $$D_V^{-1} * D_V = E$$

or $$D_T^{-1} * D_T = E$$

from the metering characteristics $D_V$ for full operation or $D_T$ for partial shut-down operation, "E" denoting the unit matrix.

At the time of the switchover from full operation to partial shut-down operation, a controller signal $S_{R,V}$ is first of all produced in the controller $R_V$ in the full-operation branch 8. This signal is passed via the full-operation metering characteristic $D_V$. The full-operation actuating signal $S_{St,V}$ produced is fed to the inverse partial shut-down operation metering characteristic $D_T^{-1}$ illustrated in block 6 via a connecting branch 10, which connects the output of the full-operation branch 8 to the input of the partial shut-down operation branch 9. This actuating signal is subsequently fed into the partial shut-down operation branch 9 as an input signal. A corresponding throttle-valve actuating signal $S_{St,T}$ is fed to the throttle-valve actuator via the switch 5, which is switched to pass the actuating signals for partial shut-down operation.

At the time of the switchover from partial shut-down operation to full operation, an actuating signal $S_{St,T}$ assigned to partial shut-down operation is produced in the controller $R_T$ and in the metering characteristic $D_T$ in the partial shut-down operation branch 9. This signal, however, is not fed directly to the throttle-valve actuator owing to the fact that the switch 5 is switched to allow full operation. On the contrary, the actuating signal $S_{St,T}$ is first fed via a second connecting branch 11 (which connects the output of the partial shut-down operation branch 9 to the input of the full-operation branch 10) to the inverse full-operation metering characteristic $D_V^{-1}$ (block 7). Thereafter, it is manipulated as an input signal in the full-operation controller $R_V$ and in the full-operation metering characteristic $D_V$, and finally passed via the switch 5 to the throttle-valve actuator.

In both switchover operations, the signal passes via both branches 8, 9, the inverse of the metering characteristic of the subsequent branch being additionally taken into account in the connection between the branches. This prevents torque jumps in the engine-torque curve.

The signal passes via the inverse metering characteristics only at the time of the switchover in order to carry out the necessary controller initializations for a steady transition during the controller changeover. After the switchover, the controller is once again operated in regular mode with the signal passing only via the respectively current branch for full operation or partial shut-down operation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Apparatus of controlling output torque of an internal combustion engine having first and second operating modes, comprising:

a control unit for controlling a torque regulating device of said engine, and for controlling an operating mode of said engine as between said first and second operating modes, said control unit having respective first and second control paths for the respective operating modes, each control path having a controller for generating an output control signal based on an input manipulated variable and on vehicle operating parameters, and a metering characteristic for processing said control signal to compensate for nonlinearities of a torque curve of said engine, producing actuating signals for manipulating a throttle valve of said engine;

means, operative when said vehicle is operating in said first operating mode, for causing said control unit to generate said actuating signals via said first control path; and means, operative at a time of transition from said first operating mode to said second operating mode, for causing said control unit to process an actuating signal generated by said first control path through a metering characteristic which is an inverse of the metering characteristic of said second control path, and to process an output from said inverse metering characteristic via said second control path.

2. For a vehicle having a piston engine, and a control unit for controlling torque of said engine and for controlling an operating mode of said engine as between a partial shut-down mode and a full operation mode, a method for transitioning operation of said engine between said modes, comprising:

providing said control unit with respective first and second control paths for the respective operating modes, each control path having a controller for generating an output control signal based on an input manipulated variable and on vehicle operating parameters, and a metering characteristic for processing said control signal to compensate for nonlinearities of a torque curve of said engine, producing actuating signals for manipulating a throttle valve of said engine;

during operation in a first of said modes, generating said actuating signals via said first control path; and at time of transition between said first of said modes and a second of said modes, processing an actuating signal generated by said first control path through a metering characteristic which is an inverse of the metering characteristic of said second control path, and processing an output of said inverse metering characteristic via said second control path.

3. A method for setting a specifiable target speed in a motor vehicle with an internal combustion engine which can be operated in a full operation mode, with ignition in all cylinders and, in a partial shut-down mode, with shut-down of some of the cylinders, actuating signals for the manipulation of the throttle valve of the internal combustion engine being produced in a speed-regulating system which includes a controller, taking into account vehicle-state and operating variables, wherein the actuating signals are produced by:

passing the controller output signals of the controller via a first metering characteristic to produce actuating signals which manipulate the position of a vehicle throttle valve, respective metering characteristics being provided for both full operation and partial shut-down operation; and at a time of switchover between full operation and partial shut-down operation, passing the output signals of the controller first via the first metering characteristic assigned to operation theretofore, and then via an inverse metering characteristic assigned to subsequent operation, the inverse metering characteristic being formed by inversion of a non-inverse second metering characteristic assigned to subsequent operation.

4. The method according to claim 3, wherein full operation and partial shut-down operation are assigned to respective controllers.

5. The method according to claim 4, wherein the output signal of the controller passed via the inverse metering characteristic at the time of the switchover is fed to a controller assigned to subsequent operation.

6. The method according to claim 5, wherein after the controller assigned to subsequent operation, the controller output is passed via the second metering characteristic assigned to subsequent operation.

7. The method according to claim 4, wherein controller parameters for the full-operation controller and of partial shut-down operation controller differ from each other.

8. The method according to claim 3, wherein the actuating signal is subjected to the inverse metering characteristic just once, at the time of the switchover.

9. The method according to claim 3, wherein after completion of a switchover, the actuating signal is produced exclusively by a controller and metering characteristic assigned to current operation.

* * * * *